United States Patent
Schmidt et al.

(10) Patent No.: US 11,408,451 B2
(45) Date of Patent: Aug. 9, 2022

(54) SMART VALVE WITH INTEGRATED ELECTRONICS

(71) Applicant: Bray International, Inc., Houston, TX (US)

(72) Inventors: Jim Schmidt, Houston, TX (US); Brindesh Dhruva, Katy, TX (US); Michael Kitchens, Houston, TX (US); Stan Allen, Houston, TX (US); Craig Brown, Houston, TX (US)

(73) Assignee: Bray International, Inc., Houston, TX (US)

( * ) Notice: Subject to any disclaimer, the term of this patent is extended or adjusted under 35 U.S.C. 154(b) by 80 days.

(21) Appl. No.: 16/600,864

(22) Filed: Oct. 14, 2019

(65) Prior Publication Data

US 2020/0116170 A1 Apr. 16, 2020

Related U.S. Application Data

(60) Provisional application No. 62/744,793, filed on Oct. 12, 2018.

(51) Int. Cl.
*F15B 19/00* (2006.01)
*F16K 1/22* (2006.01)
(Continued)

(52) U.S. Cl.
CPC .............. *F15B 19/005* (2013.01); *F16K 1/22* (2013.01); *F16K 31/04* (2013.01); *G05D 15/01* (2013.01); *F15B 2211/634* (2013.01)

(58) Field of Classification Search
CPC ........ F16K 1/22; F16K 31/04; F16K 37/0041; F16K 37/005; F16K 1/221; F15B 19/005; F15B 2211/634; G05D 15/01
See application file for complete search history.

(56) References Cited

U.S. PATENT DOCUMENTS

| | | | |
|---|---|---|---|
| 5,251,148 A | 10/1993 | Haines et al. | |
| 5,616,829 A * | 4/1997 | Balaschak | F16K 31/046 137/551 |

(Continued)

FOREIGN PATENT DOCUMENTS

| | | |
|---|---|---|
| CN | 1525094 A | 9/2004 |
| CN | 202327346 U | 7/2012 |

(Continued)

OTHER PUBLICATIONS

Reynolds, Peter, Improving Control Valve Maintenance with the Industrial Internet of Things, accessed on Dec. 23, 2019 at https://www.valvemagazine.com/web-only/categories/trends-forecasts/7283-improving-control-valve-maintenance-with-the-industrial-internet-of-things.html, Jan. 18, 2016, 3 pages, Valve Manufacturers Association of America, US.

(Continued)

*Primary Examiner* — Atif H Chaudry
(74) *Attorney, Agent, or Firm* — Oathout Law Firm; Mark A. Oathout; Laura Tu

(57) ABSTRACT

The embodiments disclosed herein relate to an apparatus for monitoring a valve having a control element, wherein the control element is actuated by an actuator, including a valve stem having a bore therethrough, wherein the bore is defined by a wall of the valve stem, and further wherein the valve stem is connected at a first end to the actuator and at a second end to the control element; and an electronics module within the bore of the valve stem, wherein the electronics module further includes one or more sensors within the valve stem.

10 Claims, 10 Drawing Sheets

(51) Int. Cl.
*F16K 31/04* (2006.01)
*G05D 15/01* (2006.01)

(56) References Cited

U.S. PATENT DOCUMENTS

| | | | |
|---|---|---|---|
| 6,028,534 | A | 2/2000 | Ciglenec et al. |
| 6,056,008 | A | 5/2000 | Adams et al. |
| 6,085,772 | A | 7/2000 | McGill et al. |
| 6,240,789 | B1 | 6/2001 | Morlan et al. |
| 6,371,162 | B1 | 4/2002 | Groeneveld |
| 7,097,351 | B2 | 8/2006 | Lancon et al. |
| 7,283,894 | B2 | 10/2007 | Esposito et al. |
| 7,436,312 | B2 | 10/2008 | Schultz |
| 7,581,434 | B1 | 9/2009 | Discenzo et al. |
| 7,647,940 | B2 | 1/2010 | Minervini et al. |
| 7,661,718 | B2 * | 2/2010 | Stenseide ............... F16L 57/04 285/47 |
| 7,797,062 | B2 | 9/2010 | Discenzo et al. |
| 7,930,045 | B2 | 4/2011 | Cheng |
| 8,471,194 | B2 | 6/2013 | Dolenti et al. |
| 8,600,566 | B1 | 12/2013 | Longo et al. |
| 9,303,786 | B2 | 4/2016 | Le Moing et al. |
| 9,330,560 | B2 | 5/2016 | Lawson |
| 9,529,348 | B2 | 12/2016 | Kephart et al. |
| 9,625,349 | B2 | 4/2017 | Jensen et al. |
| 9,665,091 | B2 | 5/2017 | Jauquet et al. |
| 9,845,965 | B2 | 12/2017 | Lehnert et al. |
| 9,869,981 | B2 | 1/2018 | Kemp et al. |
| 9,880,540 | B2 | 1/2018 | Nixon et al. |
| 9,915,375 | B1 | 3/2018 | Anderson |
| 9,934,671 | B1 | 4/2018 | Anderson |
| 9,989,394 | B2 | 6/2018 | Kochan, Jr. |
| 10,107,415 | B1 | 10/2018 | Woolf et al. |
| 10,135,705 | B2 | 11/2018 | Asenjo et al. |
| 10,233,786 | B2 | 3/2019 | Reigl et al. |
| 10,254,749 | B2 | 4/2019 | Main-Reade et al. |
| 10,338,551 | B2 | 7/2019 | Jirkovský |
| 10,404,569 | B2 | 9/2019 | Hershey et al. |
| 2003/0014161 | A1 | 1/2003 | Orthlieb et al. |
| 2003/0033867 | A1 | 2/2003 | Posey et al. |
| 2003/0033886 | A1 | 2/2003 | Davie et al. |
| 2004/0128033 | A1 | 7/2004 | Ku et al. |
| 2006/0272710 | A1 | 12/2006 | Minervini et al. |
| 2007/0021140 | A1 | 1/2007 | Keyes et al. |
| 2007/0034264 | A1 | 2/2007 | Kunz et al. |
| 2008/0127065 | A1 | 5/2008 | Bryant et al. |
| 2009/0222220 | A1 * | 9/2009 | Wilke ...................... G01M 3/00 702/34 |
| 2013/0206258 | A1 | 8/2013 | Duboy et al. |
| 2014/0005960 | A1 | 1/2014 | Anderson et al. |
| 2014/0209825 | A1 | 7/2014 | Fick et al. |
| 2015/0088434 | A1 | 3/2015 | Grabau et al. |
| 2015/0149100 | A1 | 5/2015 | Eisenbeis et al. |
| 2016/0169410 | A1 | 6/2016 | Wheeler et al. |
| 2016/0182285 | A1 | 6/2016 | Ferguson et al. |
| 2017/0242555 | A1 | 8/2017 | Wragg et al. |
| 2017/0292628 | A1 | 10/2017 | Dolenti |
| 2017/0292629 | A1 | 10/2017 | Dolenti |
| 2017/0326411 | A1 * | 11/2017 | Watterson .......... A63B 24/0075 |
| 2017/0356283 | A1 | 12/2017 | Al-Gouhi et al. |
| 2018/0031142 | A1 | 2/2018 | Hillo |
| 2018/0058249 | A1 | 3/2018 | Reigl |
| 2018/0058250 | A1 | 3/2018 | Reigl |
| 2018/0058255 | A1 | 3/2018 | Reigl |
| 2018/0112795 | A1 | 4/2018 | Anderson |
| 2018/0113442 | A1 | 4/2018 | Nixon et al. |
| 2018/0239371 | A1 | 8/2018 | Drees et al. |
| 2018/0313561 | A1 | 11/2018 | Sinha et al. |
| 2018/0321662 | A1 | 11/2018 | Nixon et al. |
| 2018/0321694 | A1 | 11/2018 | Ravid |
| 2019/0049930 | A1 | 2/2019 | Rossano et al. |
| 2019/0101420 | A1 * | 4/2019 | Ninomiya ............ H05K 5/0008 |
| 2019/0128292 | A1 | 5/2019 | Jensen |
| 2019/0130053 | A1 | 5/2019 | Cao |
| 2019/0154064 | A1 | 5/2019 | Lampe et al. |
| 2019/0226926 | A1 | 7/2019 | Danzy et al. |
| 2019/0242496 | A1 | 8/2019 | Miller et al. |

FOREIGN PATENT DOCUMENTS

| | | |
|---|---|---|
| DE | 102012017320 A1 | 3/2014 |
| DE | 102014015889 A1 | 5/2016 |
| DE | 102016215156 A1 | 2/2018 |
| DE | 202018101944 U1 | 5/2018 |
| EP | 0957418 B1 | 11/1999 |
| EP | 2385280 A1 | 11/2011 |
| EP | 3267274 A1 | 1/2018 |
| EP | 3325865 A1 | 5/2018 |
| WO | 2011146502 A1 | 11/2011 |
| WO | 2013169515 A1 | 11/2013 |
| WO | 2015020826 A1 | 2/2015 |

OTHER PUBLICATIONS

Devrell, Mike, IoT in the Valve and Actuator Industry, accessed on Dec. 23, 2019 at https://cdn.ymaws.com/www.vma.org/resource/resmgr/2017_tech_seminar_presentations/Devrell_-_The_Internet_of_Th.pdf, Mar. 3, 2017, 44 pages, Valve Manufacturers Association of America, US.

Hale, Stan, ValveWatch (R) Real Time Valve Monitoring Matures Exactly When Needed, accessed on Jan. 7, 2020 at http://ebrochure.mrcglobal.com/ValveWatch/, Oct. 1, 2017, 12 pages, MRC Global, US.

Lanel, Franccis, PCT International Search Report for International Application No. PCT/US2019/056070, dated Mar. 24, 2020, 7 pages, European Patent Office, Rijswijk, Netherlands.

Lanel, François, PCT Written Opinion of the International Searching Authority for International Application No. PCT/US2019/056070, dated Mar. 24, 2020, 10 pages, European Patent Office, Rijswijk, Netherlands.

Müller, Bernhard, PCT International Search Report for International Application No. PCT/US2019/064989, dated Mar. 20, 2020, 5 pages, European Patent Office, Rijswijk, Netherlands.

Müller, Bernhard, PCT Written Opinion of the International Searching Authority for International Application No. PCT/US2019/064989, dated Mar. 20, 2020, 11 pages, European Patent Office, Rijswijk, Netherlands.

Lanel, Francois, PCT International Search Report for PCT/US2020/067644, dated Apr. 13, 2021, 7 pages, European Patent Office, Rijswijk, Netherlands.

Lanel, Francois, Written Opinion of the International Searching Authority for PCT/US2020/067644, dated Apr. 13, 2021, 7 pages, European Patent Office, Rijswijk, Netherlands.

* cited by examiner

SMART VALVE WITH INTEGRATED ELECTRONICS

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

Technical field: The subject matter generally relates to apparatus and techniques for monitoring and managing industrial process control systems, in particular the underlying valves and actuators. The subject matter further relates to predictive analysis based on the monitored characteristics of the underlying valves and actuators of industrial process control systems.

The overall performance of the process of the industrial process control system can be characterized by monitoring key metrics tied to the process. Key metrics can be measured both directly and indirectly with advantages and disadvantages inherent to both techniques. Indirect measurements are conventionally used in attempt to obtain empirical data through a process of deduction. As an example, actuator operating torque on an electric actuator can be deduced by monitoring the motor current. Valve wear can be deduced by obtaining a baseline vibration measurement by comparing this measurement to vibration overtime. Direct measurement techniques are the most desirable but also the most impractical and have not thus far been successfully commercially implemented in practice. It is important to understand valve torque and to characterize it overtime to better understand how the valve is performing in the process. Measuring valve torque directly has been conventionally impractical. The valve stem which is attached to the valve is directly engaged with the actuator making it very difficult to couple a load cell or other device to directly measure torque. The challenges when monitoring key metrics of a control valve include the placement of the sensors, providing power to the sensors, and processing data from the sensors. Therefore, a need exists for an apparatus and a technique that can provide direct measurement of key metrics that have been conventionally very difficult to obtain and measure given the physical constraints of a control valve.

BRIEF SUMMARY

The embodiments disclosed herein relate to an apparatus for monitoring a valve having a control element, wherein the control element is actuated by an actuator, including a valve stem having a bore therethrough, wherein the bore is defined by a wall of the valve stem, and further wherein the valve stem is connected at a first end to the actuator and at a second end to the control element; and an electronics module within the bore of the valve stem, wherein the electronics module further includes one or more sensors within the valve stem.

BRIEF DESCRIPTION OF THE DRAWINGS

The embodiments may be better understood, and numerous objects, features, and advantages made apparent to those skilled in the art by referencing the accompanying drawings.

These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
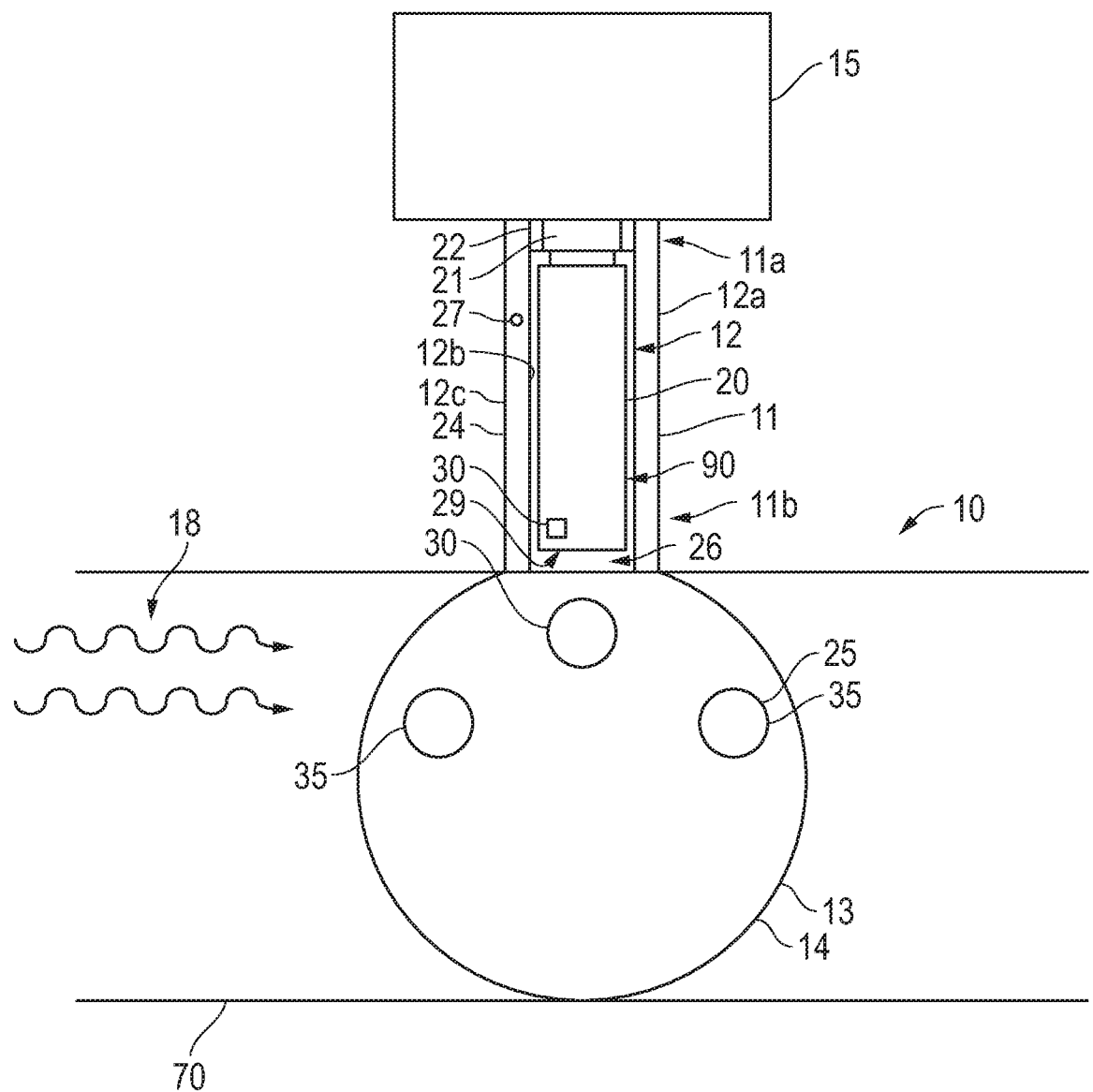
FIG. 1 depicts a schematic diagram of an exemplary embodiment of a smart valve with an integrated electronics module and actuator.
Figure 2:
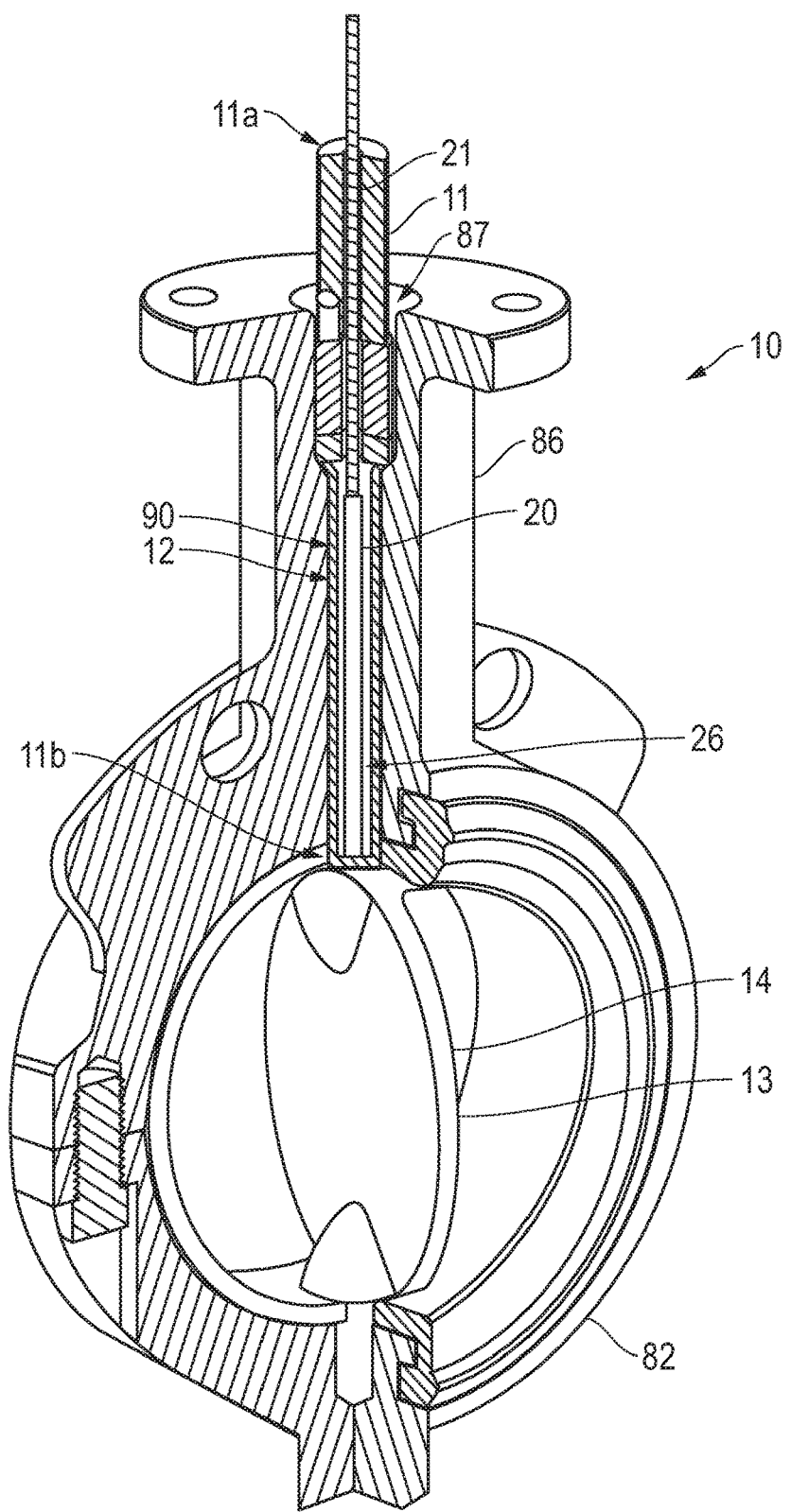
FIG. 2 depicts a partially cut away view of an exemplary embodiment of a smart valve having an integrated electronics module.

FIG. 1 depicts a schematic diagram of an exemplary embodiment of an improved valve, smart valve, or smart valve system 10 with an integrated electronics module 20 and actuator 15. FIG. 2 depicts a partially cut away view of an exemplary embodiment of a smart valve 10 having an integrated electronics module 20. The challenges when designing a valve apparatus or system 10 to monitor key metrics which characterize the performance and wear of a control valve 10 include: the placement of the sensors 25, providing power to the sensors, and processing data 60 received from the sensors 25. Additionally, if sensors 25 are placed on a valve stem 11 or a valve 10, there has not previously been an effective solution providing the necessary data communication and power connection between the sensors 25 and microcontrollers or microprocessors 23 capable of receiving and processing the sensor data 60.

By way of example only, in the exemplary embodiments as shown in FIGS. 1 and 2, the disclosure proposes embedding an electronics module 20 inside a cavity or hollow 90 of a valve stem 11 to address the challenge of placing sensors 25 on a valve 10 for direct measurement of key metrics 60. A conventional valve stem may be a solid metal cylinder which applies the acting force on the underlying valve. The solid stem may typically be used to reduce manufacturing cost but in terms of mechanical strength, a valve shaft 11 defining a cavity 90 can also supply the required stem force while meeting Maximum Allowable Stem Shear Torque, or MAST, requirements. The shaft 11 with a cavity 90 has the added benefit of providing a housing for the electronics module 20, direct access to the underlying control element 13 such as a disk 14, ball 19, gate (not illustrated) and other flow control elements 13 as known in the art, and the shaft 11 with a cavity 90 also provides an electrical pathway to the controlling actuator 15 which can provide power to the electronic module 20 and act as a data communication gateway.

As shown in FIGS. 1 and 2, the smart valve 10 may be situated in an industrial process control system 70, where the smart valve 10 may control a media flow 18 through a flow control element 13 set within a valve body 82. The smart valve 10 further includes an actuator 15 and a valve stem 11 defining a hollow or cavity 90, wherein the hollow or cavity 90 (which may be a bore 12, a slot 92, a passage or any other hole or void defined in the stem 11) is defined longitudinally or lengthwise therethrough the valve stem 11 (e.g. along the length of the valve stem 11, wherein the length of the valve stem 11 may be defined by the distance from one end 11 a to the other end 11 b of the valve stem 11). In alternate exemplary embodiments, the bore 12, slot 92 or cavity 90 may instead by defined laterally or otherwise across or through the valve stem 11 (by way of example only, perpendicular to the length of the valve stem 11). The valve stem 11 may connect at the first end 11a to the actuator 15 and at the second end 11b to the flow control element 13. Further, the valve stem 11 supplies an acting force from the actuator 15 upon the underlying control element 13. The valve body 82 may further include a bonnet 86 which defines a passage or passageway 87 between the valve body 82 and the actuator 15. The valve stem 11 may be inserted into passage or passageway 87 of the bonnet 86. The actuator 15 may be an electronic, pneumatic, hydraulic, manual, or any other actuator 15 as known in the art to manipulate a valve stem 11 and thus the flow control element 13.

An electronics module 20 is embedded, integrated into or housed within the cavity 90 defined as a bore 12 of valve stem 11. In alternative exemplary embodiments, the electronics module 20 may be embedded, integrated into or housed within the cavity 90 defined as a slot 92 of the valve stem 11 (see, e.g. FIGS. 10 and 12). A primary or center conductor 21 may connect the electronics module 20 with the actuator 15, and the primary conductor 21 may provide power and data communication between the actuator 15 and the electronics module 20 within the smart valve 10. The primary conductor 21 may be a wire or a cable in certain exemplary embodiments, providing a single wire path for power and data communication between the controlling actuator 15 and the electronics module 20. In alternative exemplary embodiments, the end of the valve shaft or stem 11 may be connected to a center conductor 21, that has a "spring loaded" contact point that can engage with the center conductor of the actuator pinion or quadrant gear (see e.g. quadrant gear with center conductor 16 in FIG. 3 and pinion with center conductor 17 in FIG. 4), similar to a stationary slip ring. The engagement or contact point provides electrical contact between both the valve 10 and the actuator 15 without a need for a physical wire or cable between the valve 10 and the actuator 15—thus the primary conductor 21 may not necessarily be a wire or cable in these alternate exemplary embodiments. The electronics module 20 may further be integrated, encased, embedded or attached to the bore 12, slot 92 or cavity 90 of the valve stem 11 with an epoxy or adhesive 26. The cavity 90 of the valve stem 11 provides the electronic module 20 with direct access to the control element 13. Insulation 22 may be provided to insulate the primary conductor 21 from the conducting stem wall or body 12a or 92a, thus forming an electrical return path or a complete electrical circuit 24. As shown on FIG. 1, the electronics module 20 may be in data communication with (e.g. receiving data signals 60 from and transmitting data signals 60 to) one or more sensors 25, such as one or more load cell, strain gauge, or pressure sensors 30, and one or more thermocouples 35 or temperature sensors. The electronics module 20 may be in further data communication with a flow sensor 43 and accelerometer 31 (not shown in FIG. 1). In certain exemplary embodiments, one or more of the sensors 25 may be located within the electronics module 20 or within the valve stem bore 12; other sensors 25 may optionally be located on or within the flow control element 13. Furthermore, one or more of these sensors 25 may optionally be installed, mounted or attached, by way of example only, to the valve stem wall/body interior surface 12b or 92b, or to the valve stem wall/body exterior surface 12c or 92c. Additional sensors 25 which may be in data communication with the electronics module 20 are further described below.

Figure 3:
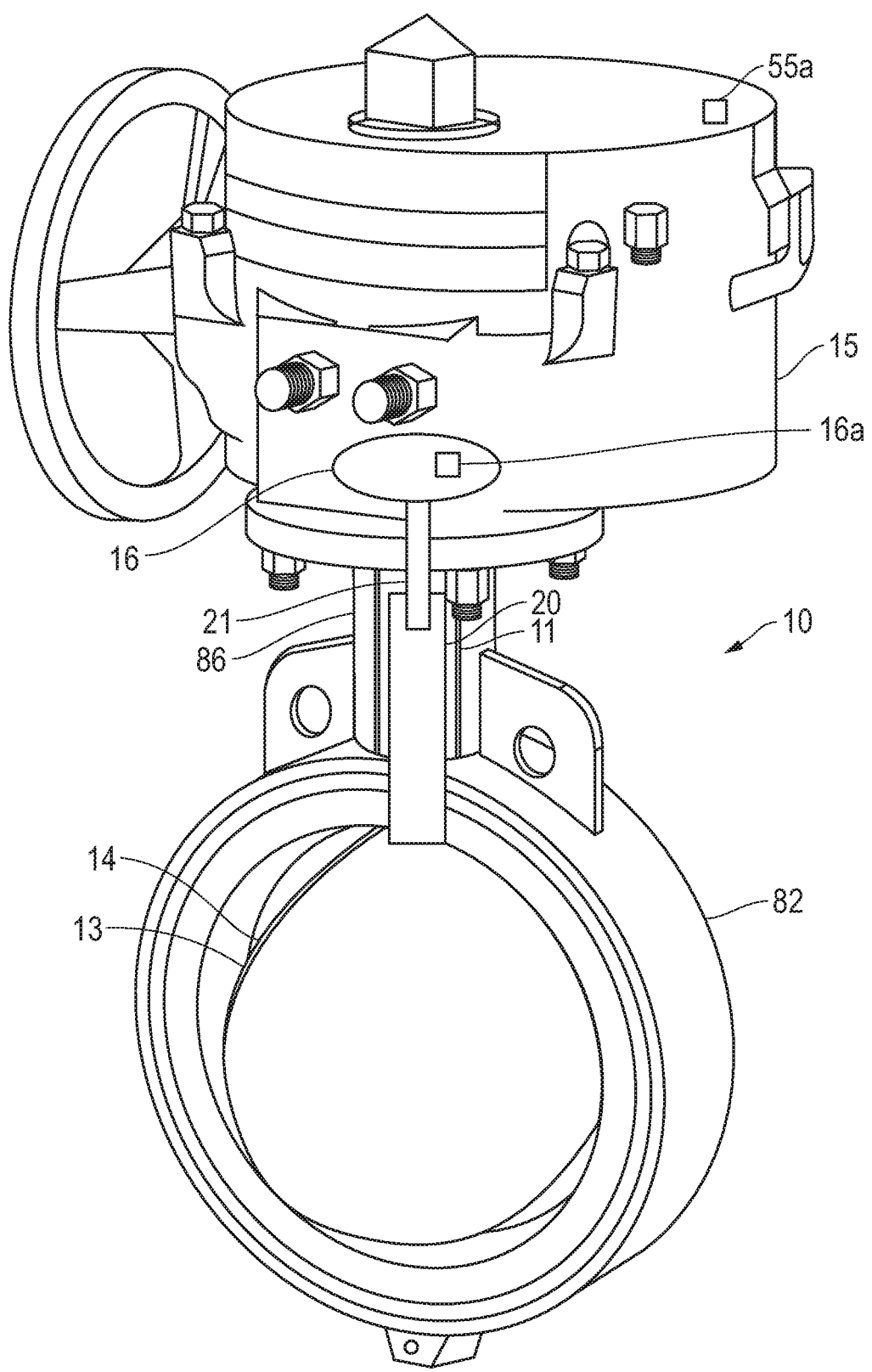
FIG. 3 depicts an isometric side view of an exemplary embodiment of a smart valve having an electric actuator and an integrated electronics module.
Figure 4:
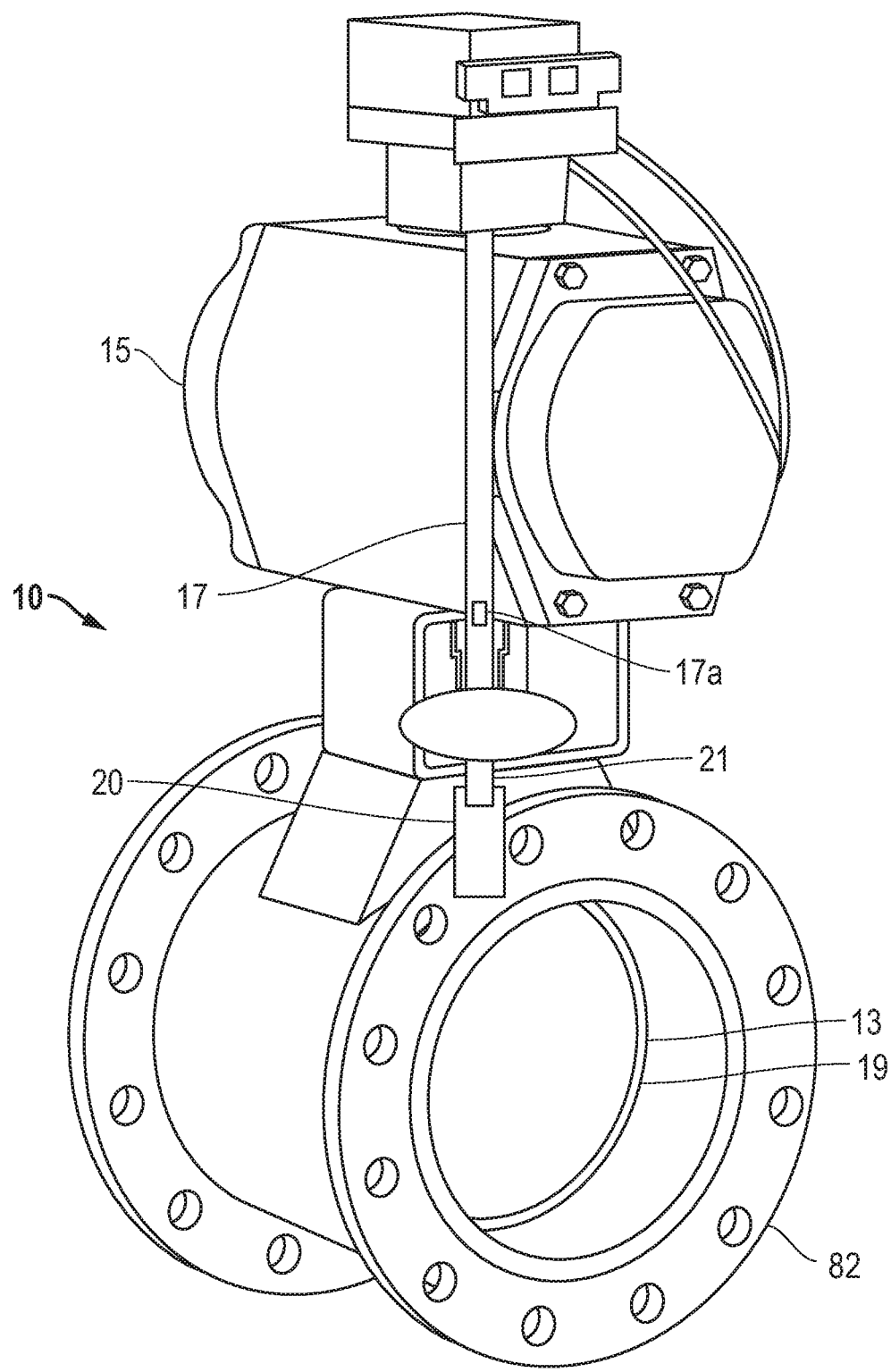
FIG. 4 depicts an isometric side view of an exemplary embodiment of a smart valve having of a pneumatic actuator and an integrated electronics module.

FIGS. 3 and 4 depict isometric side views of alternate exemplary embodiments of a smart valve 10 each having integrated electronics modules 20, and showing alternate control elements 13 and alternate types of actuators 15. FIG. 3 depicts the smart valve 10 as being a butterfly valve having a disc 14, wherein the smart valve 10 is actuated by an electronic actuator 15. The actuator 15 may optionally include a digital or analog interface or display, or alert system 55a accessible or viewable by an operator of the valve 10. The integrated electronics module 20 is contained or embedded within the cavity 90, bore 12 or slot 92 of the valve stem 11, which connects to the top of the disc 14. The electronics module 20 is in data communication with the primary conductor 21, which is further in data communication (and/or physically connected) to the quadrant gear with a center conductor 16. The quadrant gear may have an electromechanical coupling with the center conductor. The center conductor may include or be in data communication with a microprocessor, microcontroller or computing unit 16a in the actuator 15. Additionally, the center conductor 21 may be used to connect or supply power to the encapsulated electronics module 20 and to simultaneously provide an electrical communication path for digital communication between the encapsulated electronics 20 and the connected actuator 15. The electronic communication, by way of example only, may be in the form FSK (Frequency Shift Keying), modulation, or other communication modes. FIG. 4 depicts the smart valve 10 as being a ball valve having ball 19, wherein the smart valve 10 is actuated by a pneumatic actuator 15. The integrated electronics module 20 is contained or embedded within the valve stem 11, which connects to the top of the ball 19 or control element 13. The electronics module 20 is in data communication with the primary conductor 21, which is further in data communication (and/or physically connected) to the pinion with a center conductor 17. The center conductor may include or be in data communication with a microprocessor, microcontroller or computing unit 17a in the actuator 15.

In alternative exemplary embodiments of the smart valve 10, the control element 13 may be an improved control element 13, wherein the control element 13, such as the disc 14 or ball 19 (or other control element 13) may be hollow or define a bore, hollow or cavity 81. See, for example the alternative exemplary embodiment of FIG. 8, wherein the control element 13 has a bore, hollow or cavity 81 defined by the walls 80 of the control element 13. The bore, hollow or cavity 81 does not necessarily extend through the control element 13, but in some exemplary embodiments may do so. The electronics module 20 is embedded or housed within the hollowed flow control element 13, and a conductor 21 may transmit and receive data, data signals or metrics, and supply power to the electronics module 20 and its components (including microprocessor 23 and one or more sensors 25) through an opening 83 in the walls 80 between the stem 11 and the control element 13. The sensors 25 may be located within the bore 81 or within the electronics module 20, or attached or mounted to an interior surface 80a or an exterior surface 80b of the control element wall 80. In the exemplary embodiments depicted in FIGS. 1-8, the sensors 25 may be in data and power communication with the electronics module 20 via wire or cables 84, or alternatively, may be in wireless data communication with or welded/attached/connected directly to the electronics module 20 in other exemplary embodiments. The sensors 25 may also alternatively be powered by battery (not illustrated, and may be external or internal). In further alternative exemplary embodiments (not illustrated), the valve body 82 may be hollow and the electronics module 20 (including microprocessor 23 and sensors 25), may be located within the hollowed valve body 82, and a conductor 21 may connect the electronics module 20 to the actuator 15.

Figure 9:
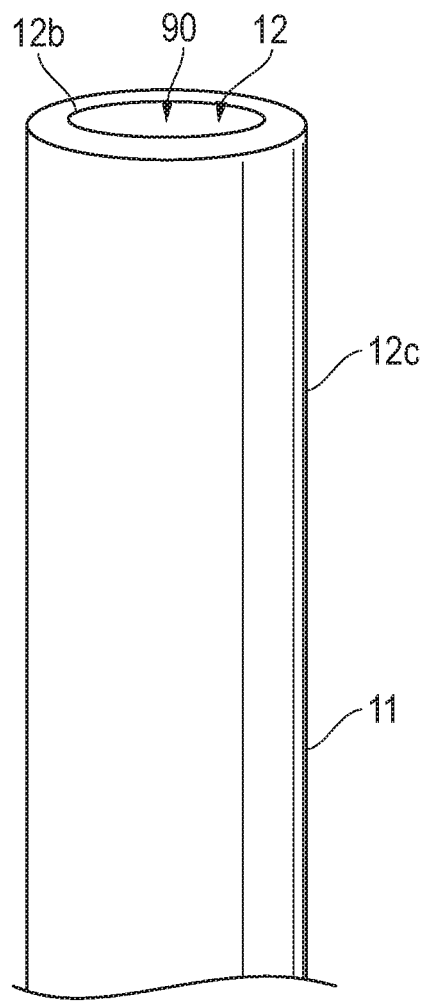
FIG. 9 depicts a partial front perspective view of an exemplary embodiment of a valve stem defining a bore for a smart valve and integrated electronics module system.
Figure 10:
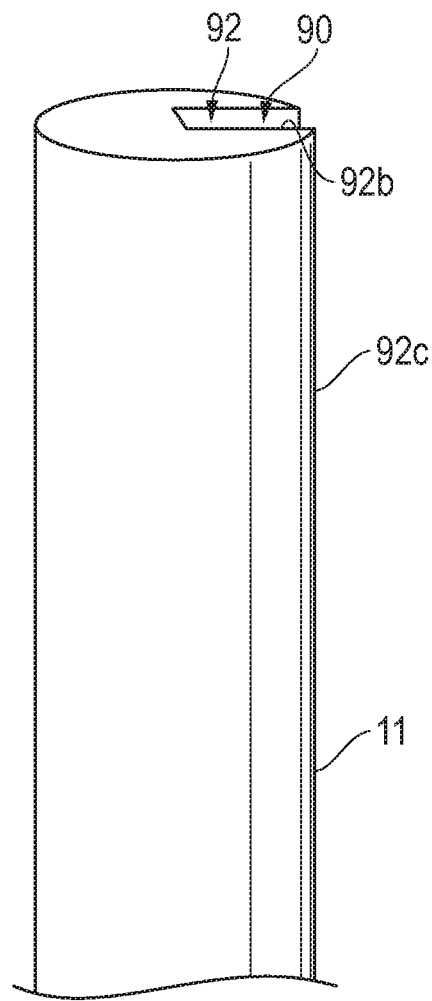
FIG. 10 depicts a partial front perspective view of an exemplary embodiment of a valve stem defining a slot for a smart valve and integrated electronics module system.
Figure 11:
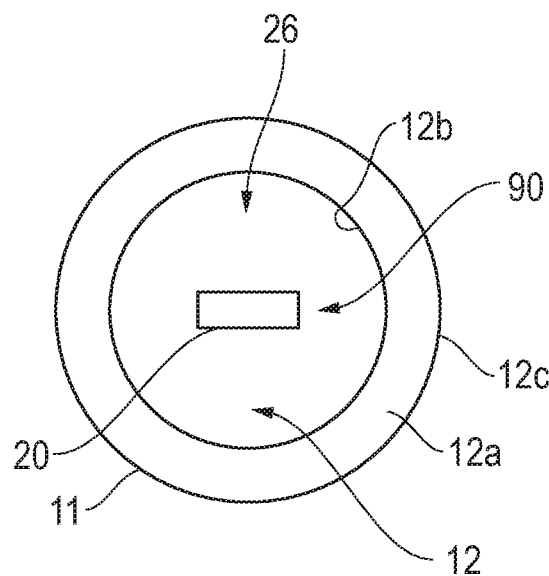
FIG. 11 depicts a cross sectional lateral view of a schematic diagram of an exemplary embodiment of a valve stem defining a bore for a smart valve and integrated electronics module system.
Figure 12:
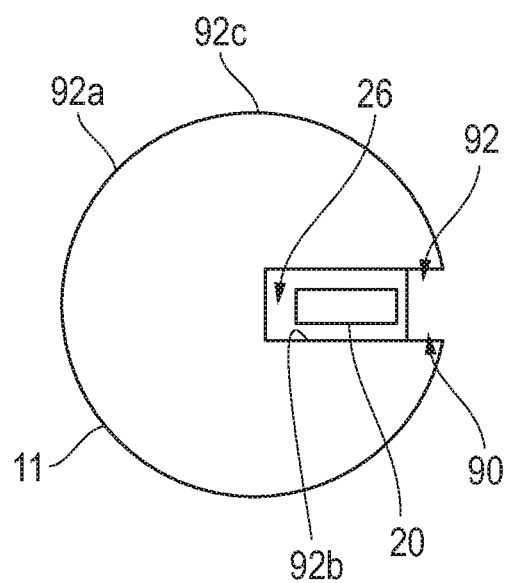
FIG. 12 depicts a cross sectional lateral view of a schematic diagram of an exemplary embodiment of a valve stem defining a slot for a smart valve and integrated electronics module system.

In alternative exemplary embodiments of the stem or shaft 11, as depicted in FIGS. 10 and 12, the stem 11 may define a cavity 90 as a slot 92 (compare with, e.g., the cavity 90 being defined as a bore 12 in the stem 11 of FIGS. 9 and 11). FIGS. 9 and 10 depict partial front perspective views of the alternate exemplary embodiments of a valve stem 11 for housing an integrated electronics module 20 of a smart valve 10. FIGS. 11 and 12 depict cross sectional lateral views of the stem 11 housing the integrated electronics module 20 in alternate exemplary embodiments. In the alternative exemplary embodiment as depicted in FIGS. 10 and 12, the slot 92 may be defined substantially along the length of the body 92a of the stem 11 and may house the electronics module 20 as substantially similarly described above regarding the embodiments defining the cavity 90 as a bore 12. The slot 92 may be defined by the internal or interior surface 92b of stem 11. Moreover, the slot 92 of the improved stem 11 may also include epoxy or resin 26 to attach, adhere, encase or otherwise bind the electronics module 20 within slot 92 of the stem 11, or to the interior surface 92b of the slot 92.

Figure 5:
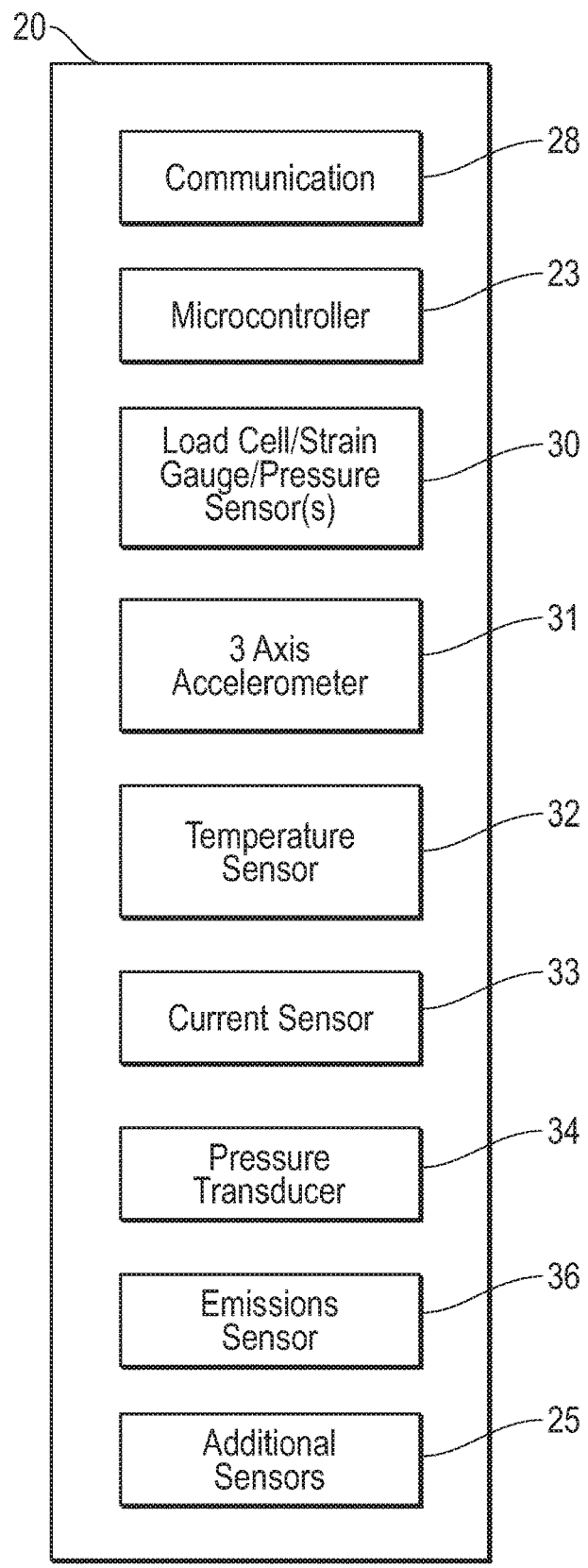
FIG. 5 depicts a schematic diagram of an exemplary embodiment of an integrated electronics module.
Figure 6:
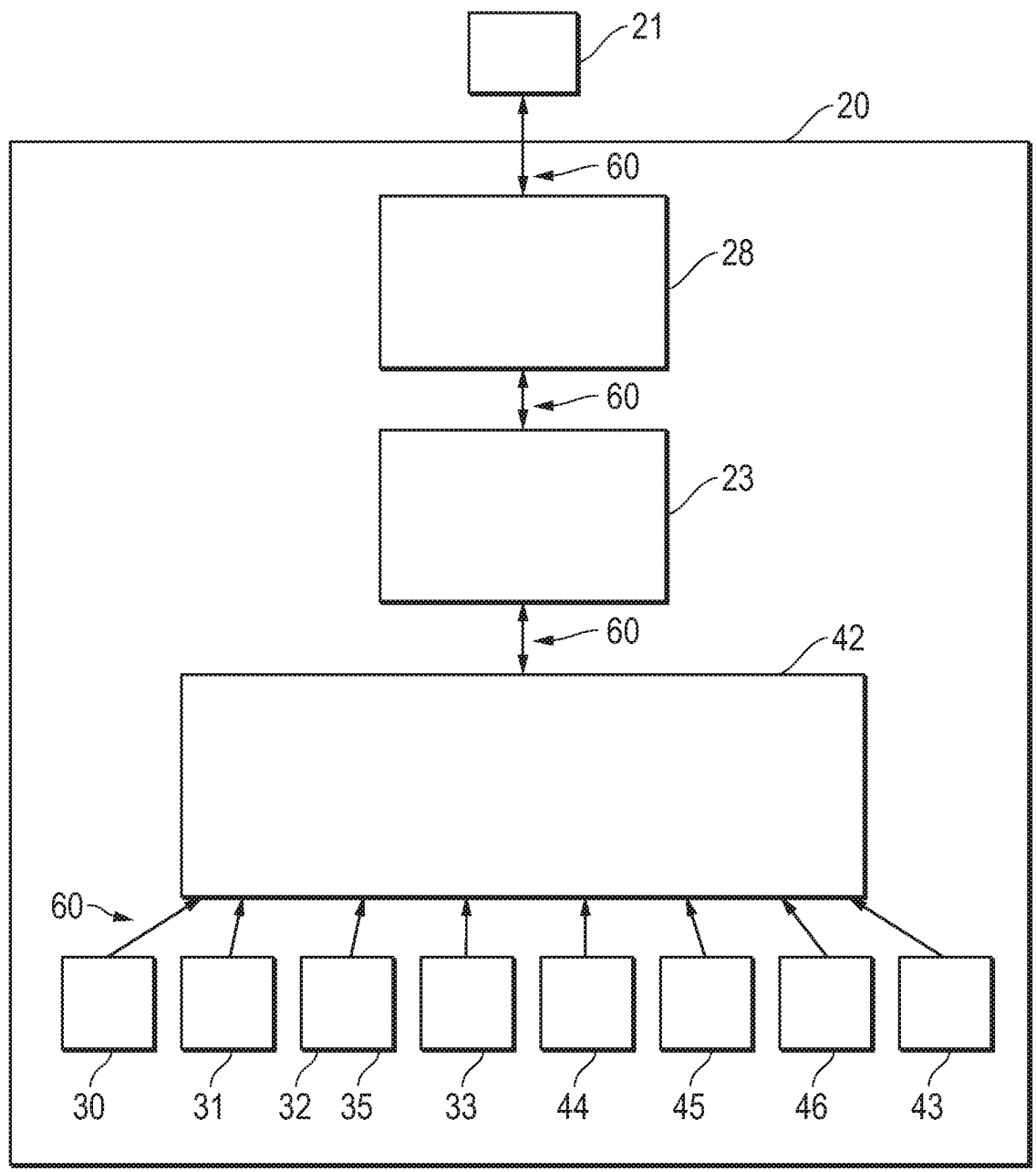
FIG. 6 depicts a block diagram of an exemplary embodiment of an integrated electronics module.

FIG. 5 depicts a schematic diagram of an exemplary embodiment of an integrated electronics module 20. The electronics module or embedded electronics 20 provides an access point for sensors 25 embedded within the valve 10 such as pressure sensors 30 and flow sensors (or self-heating thermocouples 35 and/or flow measurement sensors) (see e.g. FIG. 1). The electronics module 20 may include one or more of the following: a communications and power module 28; a microprocessor, microcontroller or computing unit 23; one or more load cell(s), strain gauge(s), or pressure sensor(s) 30; an accelerometer 31, which may in certain exemplary embodiments be a 3-axis accelerometer; a temperature sensor 32 or thermocouple 35; a current sensor 33; a pressure transducer 34; an emissions sensor 36; and any other additional sensors 25. FIG. 6 depicts a block diagram of an exemplary embodiment of an integrated electronics module 20, and of the data and/or power communication pathways of the electronics module 20. In FIG. 6, the communication and power module or block 28 of the electronics module 20 receives data and power from and transmits data to the primary conductor 21. The optional communication and power block 28 may also communicate data and/or supplies power to the microcontroller module 23, and further to the sensor interface 42. The sensor interface 42 receives or obtains one or more data or metric measurements 60 from the sensors 25 which may include one or more of the following types of sensors 25 (and may include multiples of each type of sensor 25): a force, strain, or pressure sensor 30; a vibration sensor or accelerometer 31; a temperature sensor 32 or thermocouple 35; a flow sensor 43; a torque sensor 44; an emissions sensor 45; and/or a current sensor 33. The primary conductor 21, communication and power module 28, the microcontroller module 23, and the sensor interface 42 (and sensors 25) may both receive and transmit data 60 and power interchangeably between the data communication connections or pathways. The sensor interface 42 may also provide power and instructions in the form of data to the sensors 25 retrieving or measuring data or metrics 60.

Regarding each type of sensor 25, the current sensor 33 may sense, record, measure or obtain and transmit a measurement, metric or data 60 of the electric actuator 15 motor current. The data 60 of the electric actuator 15 motor current is indicative of output torque of the valve 10 and actuator 15 wear; in particular, an increase in the measured motor current may be proportional to the output torque of the valve 10 and actuator 15 wear. The strain gauge, pressure sensor and/or load cell 30 may sense, record, measure or obtain and transmit a metric or data 60 of the valve stem 11 torque. The data or metric 60 on the valve stem 11 torque is indicative of the actuator 15 torque, the packing torque and the valve seat torque (depending on valve 10 position), as the valve stem 11 torque is the sum of these torques. The electronics module 20 may contain the embedded sensors 25, optionally as strain gauges, pressure sensors or load cells 30 at the extremes, ends or edges 29 of the circuit board of the microprocessor 23 or electronics module 20 to detect valve stem 11 torsional forces which then can be directly correlated to valve stem 11 torque. This measurement technique is made possible through the encasing of the electronics module 20 in epoxy 26 which is bound to the electronics assembly module 20 and the interior surface 12b or 92b of the valve stem 11. The strain gauge 30 may also optionally be placed, adhered, or attached onto the stem body/wall interior surface 12b or 92b, the stem body/wall exterior surface 12c or 92c, interior surface 80a of the control element 13 wall 80, and/or the exterior surface 80b of the control element 13 wall 80 to obtain direct torque measurements 60. The valve stem 11 will generally experience primarily torsional forces, but may also experience internal pressure, bending, and tension shaft forces, which may be sensed or observed by other sensors 25. An optional second pressure sensor 30 may sense, record, measure or obtain and transmit a metric or data 60 of a pneumatic actuator 15 air pressure. Measurements 60 regarding the acting air pressure may be indicative of the output torque of the smart valve 10. The accelerometer or 3-axis accelerometer 31 may sense, record, measure or obtain and transmit a measurement, metric or data 60 of the valve vibration. The valve vibration is indicative of valve seat wear when the control element 13 is entering or leaving the seat; the valve vibration may also indicate cavitation if present, and can also indicate packing wear. The thermocouple 35 or temperature sensor 32 may sense, record, measure or obtain and transmit a measurement, metric or datapoint 60 of the valve temperature, which is indicative of or correlated to accelerated packing and valve seat wear due to temperature. A valve stem emissions sensor 36 may measure, sense, obtain or record and transmit a data or measurement 60 regarding the presence and amount of gas emissions between the valve 10 and valve stem 11, which may correlate to or indicate escape or leakage of the media 18 or its fumes into the process system 70 and valve 10 or valve seal wear/deterioration. The valve stem emissions sensor 36 may obtain the data 60 via an aperture 27 in the valve stem wall/body 12a, 92a (see e.g. FIG. 1). In alternate exemplary embodiments, such as depicted in FIG. 8, the aperture 27 and valve stem emissions sensor 36 may be located on or within the control element 13. The aperture 27 may also extend through the epoxy 26 so that the emissions sensor 36 may have access to emissions entering through the aperture 27. A second thermocouple 35 or temperature sensor 32 may also sense and transmit data, measurements, or metrics 60 regarding the thermal differential of the media flow 18 or media fluid, which may be correlated to valve 10 torque and cavitation. A pressure transducer 34 may sense, record, measure or obtain and transmit a measurement, metric or data 60 of the media pressure, which may also be correlated to valve 10 torque and cavitation. Data, metrics, or measurements 60 regarding the media type, which correlates to the valve torque and operation may be entered as input into the microprocessor or computing unit 23 of the electronics module 20. The data, metrics, signals, and measurements 60 regarding the actuator motor current, actuator air pressure, valve stem torque, valve vibration, valve temperature, emissions, media type, media flow and media pressure may be transmitted to and received by the microprocessor or computing unit 23. The data or signals 60 may be further processed and analyzed by the microprocessor or computing unit 23 to provide predictive modeling or analysis, or to determine desired valve 10 parameters for the smart valve system 10 as further described for FIG. 7.

Figure 7:
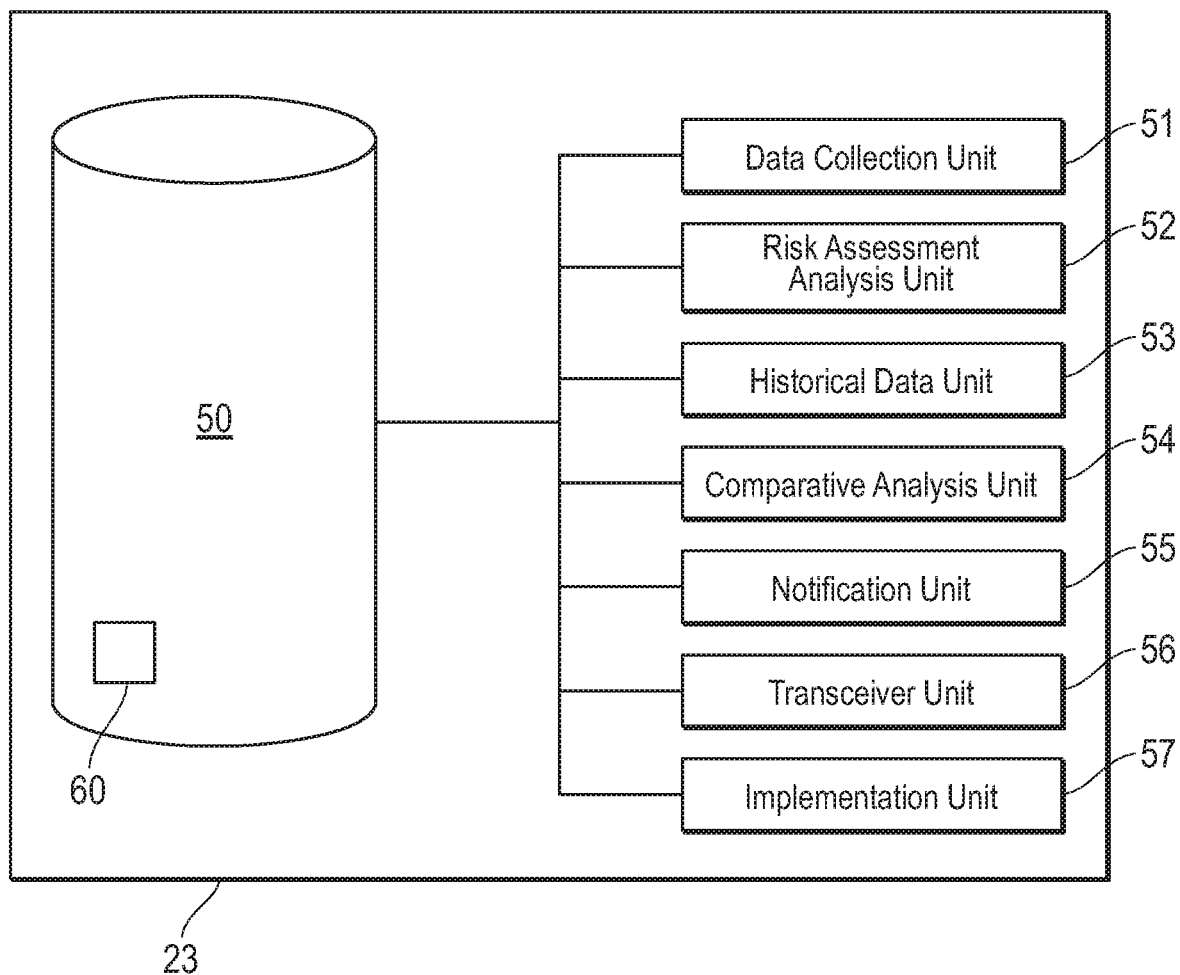
FIG. 7 depicts a schematic diagram of an exemplary embodiment of a microcontroller or microprocessor for smart valve and integrated electronics module system.
Figure 8:
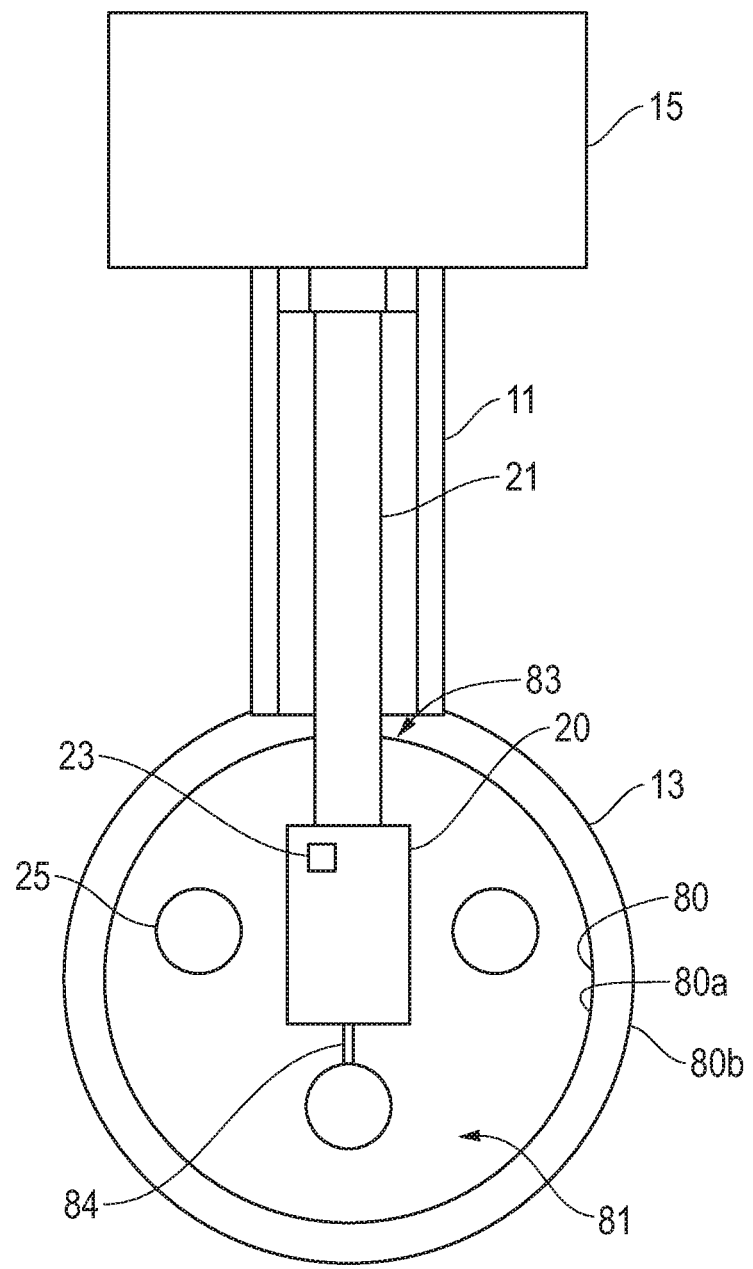
FIG. 8 depicts a schematic diagram of an alternate exemplary embodiment of a smart valve with an integrated electronics module and actuator.

FIG. 7 depicts a schematic diagram of an exemplary embodiment of a microcontroller or microprocessor 23 (and also microprocessor or computing units 16a and 17a) for smart valve 10 and integrated electronics module 20 system. The microprocessor, microcontroller or computing unit 23 (including microprocessors 16a and 17a) may have components including, but not limited to, a storage device 50, a data collection unit 51, a risk assessment or analysis unit 52, a historical data unit 53, a comparative analysis unit 54, a notification unit 55, and a transceiver unit 56. Generally, any description or disclosure regarding analysis and processing based on sensor 25 retrieved/observed data, measurements or metrics 60 that is described as performed by the microprocessor 23 may also be performed by remotely and also by microprocessors 16a or 17a within the actuators 15, as the primary conductor 21 relays, transmits and communicates data 60 between the actuator 15 and the electronics module 20 which contains the microprocessor 23.

The microprocessor 23 and its components are generally implemented as electronic circuitry and processor-based computational components controlled by computer instructions stored in physical data storage components 50, including various types of electronic memory and/or mass-storage devices. It should be noted, at the onset, that computer instructions stored in physical data storage devices 50 and executed within processors or microcontrollers 23 comprise the control components of a wide variety of modern devices, machines, and systems, and are as tangible, physical, and real as any other component of a device, machine, or system. Occasionally, statements are encountered that suggest that computer-instruction-implemented control logic is "merely software" or something abstract and less tangible than physical machine components. Those familiar with modern science and technology understand that this is not the case. Computer instructions executed by processors must be physical entities stored in physical devices. Otherwise, the processors would not be able to access and execute the instructions. The term "software" can be applied to a symbolic representation of a program or routine, such as a printout or displayed list of programming-language statements, but such symbolic representations of computer programs are not executed by processors. Instead, processors fetch and execute computer instructions stored in physical states within physical data storage devices 50. Similarly, computer-readable media are physical data storage media 50, such as disks, memories, and mass-storage devices that store data in a tangible, physical form that can be subsequently retrieved from the physical data storage media 50. Moreover, the physical data storage media 50 may optionally be integral with the microprocessor 23.

The microprocessor 23 accesses and uses a variety of different types of stored or received information, signals, feedback, data, metrics, measurements or inputs 60, including, user/operator input, in order to generate output controls or commands that may trigger or change processes of the microprocessor 23 or the smart valve 10, or otherwise transmit signals and data. Such changed processes may include: disabling power to the actuator 15 or valve 10; changing the position of the control element 13; and visual and audible alerts or alarms to the operator of the process system 70, amongst others. The data 60 (for example, from the accelerometer 31, flow sensor 43, temperature sensor 32, strain gauge 30, and/or torque sensors 44) may be collected and analyzed both singularly and collectively to determine faults, predicted faults, comparison to base line readings, and others using statistical models such as Bayesian decision making and fine analysis of raw data 60 using Fast Fourier Transforms (hereinafter, also "FFT"). The computations may be distributed between the microprocessors 23 and other computing units or electronics within the actuator 15 (such as microprocessors 16a or 17a). Received/measured variables, data, measurements or metrics 60, or input/stored variables, metrics, information or data 60, whether received to the microprocessor 23 by user-input or feedback from any of the sensors 25, includes at least: electric actuator motor current, pneumatic actuator air pressure, valve stem torque, valve vibration, valve temperature, valve stem emissions, media type, media flow, media pressure, and actuator dwell time amongst others. Additional information used by the microprocessor 23 in its algorithms may include one or more stored control schedules, algorithms, immediate control inputs received through a control or display interface 55a, and data, commands, commissioning, and other information received from other processing systems (including the data communication between the computing units 23, 16a and 17a), remote data-processing systems, including cloud-based data-processing systems (not illustrated) and may further include statistical analysis of mean, deviation, deviation of baseline, Bayesian, and FFT (including other analyses) of data 60. Further, in alternative exemplary embodiments, the microprocessor 23 may monitor and coordinate data feedback and/or input 60 for the valve 10 to automatically adjust the position of the control element 13, or the actuator 15, or to alert an operator of maintenance or repair needs as based on the measurements/metrics 60 or saved/stored data 60 for the valve 10. Analog and digital interfaces 55a of the microcontroller 23 may process the sensor data 60 and perform real-time analysis of the collected data 60. The microprocessor 23 can extract and deduce from the raw real-time sensor data 60 information or predictions regarding (and not limited to): remaining valve 10 life, remaining actuator 15 life, service intervals, potential pending failure or loss of service, and preventative maintenance. By way of example only, the microprocessor 23 may monitor and record the valve 10 vibration, and valve stem 11 torque data 60 over several periods of time into the physical data storage component 50, and adjust the position of the smart valve 10 accordingly to account for wear/deterioration for a necessary media flow 18 volume or amount and/or alert the operator when the sensed data or metric 60 exceeds a stored desired data value or set of parameters for the corresponding sensed data 60. This history and data 60 stored by the physical data storage component 50 may be further used to troubleshoot, maintain, and repair the components of the smart valve 10 by the operator or manufacturer of the system, or by the microprocessor 23 itself. In addition to optionally generating control output to manipulate the components of the smart valve 10 (by way of example only, the actuator 15 and the control element 13), the microprocessor may optionally also provide a LED, graphic, display or analog interface (including a digital or analog interface or alarm system 55a) that allows users/operators to easily input controls and may also provide or transmit output, data, signals and other information to remote entities, other microcontrollers, and to users through an information-output interface. The interface system 55a may be an actuator 15 mounted electronics having the ability to display information and in-turn communicate further information to a process controller or other instrumentation connected to a network for actuator 15, including, but not limited to, cloud-based network and storage. Digital communication may allow the electronics or computing units within the actuator 15 to directly communicate with the encapsulated electronics module 20. In this manner, the microprocessor 23 may act as a mechanism to sense or receive feedback to adjust and correct the smart valve 10 system(s). While, in certain exemplary embodiments, the encapsulated microprocessor 23 may not have a direct display/digital interface 55a, the microprocessor 23 may include a LED indicator visible through a window on the valve stem shaft 11 (not illustrated).

Embodiments of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the disclosed subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium; optical storage medium; magneto-optical storage medium; read only memory; random access memory; erasable programmable memory; flash memory; or other types of medium suitable for storing electronic instructions. In addition, the various embodiments may be embodied in an electrical, optical, acoustical or other form of propagated signal (e.g., carrier waves, infrared signals, digital signals, etc.), or wire line, wireless, or other communications/telemetry medium.

Computer program code for carrying out operations of the embodiments may be written in any combination of one or more programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

The storage device 50 may be any suitable storage device for storing data. The data collection unit 51 may collect, gather, manipulate, and/or categorize the data 60 transmitted by the sensors 25 about the smart or intelligent valve 10 as well as process system 70 and/or media 18 and received by the microprocessor 23 or electronics module 20. Each sensor 25 contributes metrics or data 60 which lead to a partial view of the underlying smart valve 10 and actuator 15 condition. When combining the metrics 60 of a group or plurality of sensors 25 using real-time analytical techniques, an accurate evaluation of the valve 10 and actuator 15 condition may be obtained. The data collection unit 51 may manipulate the collected data into a format that allows the operator and/or the microprocessor 23 to take appropriate action during the operations. The risk assessment or analysis unit 52 may receive the categorized data 60 from the data collection unit 51 in order to determine if there is any present or future risk likely at the smart valve 10 and may make predictions not limited to remaining valve life, remaining actuator life, service intervals, potential pending failure or loss of service, and preventative maintenance. The risk may be based on real time events that are taking place in the operations and/or based on predictive events that are likely to occur. The risk assessment or analysis unit 23 may classify the risks for the microprocessor 23 and/or the operator (such as whether to create an alert or alarm). By way of example only, techniques such as Fourier analysis of data 60 from the vibration sensor 31 can extract differences in fundamental frequencies that can show shifts in baseline performance measured at commissioning compared to long term operation. These changes can be directly correlated to actuator 15 and valve 10 performance and lead to predictive methods that indicate potential actuator 15 and valve 10 failure or predict the need for service. When this analysis is correlated with direct torque measurements 60 of the valve stem 11, the statistical significance of the correlated data results in accurate predictive assertions.

The historical data unit 53 may categorize the historical data, measurements or metrics 60 collected by the data collection unit 51. The comparative analysis unit 54 may compare the data, measurements or metrics 60 collected by the data collection unit 51, the classified risks, and/or the historical data 60 in order to determine a course of action for the operator and/or microprocessor 23. The comparative analysis unit 54 may further determine if the sensed metrics, data or measurements 60 is within a predetermined set of parameter values as previously input into the microprocessor 23. The smart valve 10 parameters may be any suitable parameters set by the manufacturer, operator, the client, or any other suitable source or algorithm. The comparative analysis unit 54 may make a determination of how serious the risk is based on the data 60 sensed and collected. The comparative analysis unit 54 may relay information to the notification unit 55 so that the notification unit 55 may alert the operator and/or take action. The notification unit 55 may alert the operator or microprocessor 23 of a real time condition, and/or a predicted condition about the smart valve 10 and/or the process control system 70. The notification unit 55 may include the visual display interface(s) (such as interface or visual alarm system 55*a* of FIG. 3), audible sounds or alarms, a kinetic or automated response, and/or a combination thereof. The transceiver unit 56 and/or the transmitter may be any suitable device configured to send and/or receive data to the microprocessor 23 (such as, by way of example, in certain exemplary embodiments, the primary conductor 21). The implementation unit 57 may be configured create and execute an implementation plan for remediation of the valve 10 (including, but not limited to disabling or enabling power to the actuator 15 or valve 10; adjusting the actuator 15 or valve 10, changing the position of the control element 13; and visual and audible alerts or alarms to the operator of the process system 70, amongst others). In another example, the operator and/or the microprocessor 23 may update, determine or provide predictions as to the smart valve 10 parameters, and/or data as operations are being performed. The operator and/or the microprocessor 23 could notify or update the historical data unit 53 of any conditions, or parameters, that need to be compared in the future.

While butterfly and ball valves have been illustrated as exemplary embodiments. Any type of industrial valve having a stem may be implemented as the smart valve 10.

While the exemplary embodiments are described with reference to various implementations and exploitations, it will be understood that these exemplary embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An apparatus for monitoring a valve having a control element, wherein the control element is actuated by an actuator, comprising:
   a valve stem, wherein the valve stem is connected at a first end to the actuator and at a second end to the control element;
   a cavity defined within the valve stem;
   an electronics module embedded within the cavity of the valve stem, wherein the electronics module further comprises one or more sensors within the valve stem;
   a conductor connecting the electronics module to the actuator;
   wherein the electronics module further comprises a microprocessor;
   an epoxy between the electronics module and the cavity of the valve stem; and
   wherein the one or more sensors comprise a thermocouple.

2. The apparatus according to claim 1, wherein the one or more sensors further comprise and accelerometer.

3. The apparatus according to claim 1, wherein the one or more sensors further comprise a strain gauge mounted on an end of the electronics module.

4. The apparatus according to claim 1, wherein the cavity is defined along the length of the valve stem.

5. An apparatus for monitoring a valve having a control element, wherein the control element is actuated by an actuator, comprising:
   a valve stem, wherein the valve stem is connected at a first end to the actuator and at a second end to the control element;
   a cavity defined within the valve stem;
   an electronics module embedded within the cavity of the valve stem, wherein the electronics module further comprises one or more sensors within the valve stem;
   a conductor connecting the electronics module to the actuator;
   wherein the electronics module further comprises a microprocessor;
   an epoxy between the electronics module and the cavity of the valve stem; and
   an aperture defined through the wall of the valve stem, and further wherein the one or more sensors comprise an emissions sensor.

6. A method for directly measuring a metric of a valve, comprising the steps of:
   providing a valve stem, wherein the valve stem defines a cavity;
   embedding an electronics module in the cavity of the valve stem;
   connecting a conductor at one end to the electronics module, wherein the conductor is connected at an opposite end to an actuator of the valve;
   supplying power to the electronics module with the conductor;
   receiving data from the electronics module with the conductor;
   transmitting data to the electronics module with the conductor;
   providing a sensor in the electronics module;
   encasing the electronics module in epoxy in the cavity;
   observing and recording the metric of the valve with the sensor;
   transmitting the metric from the sensor to the electronics module; and
   comparing the observed and recorded metric with a stored data;
   wherein the metric comprises a torque of the valve and the sensor comprises a pressure sensor in the valve stem.

7. The method according to claim 6, further comprising the step of predicting at least one of: a failure of the valve, a servicing interval of the valve, or a maintaining step for the valve.

8. The method according to claim 7, further comprising the step of alerting of the predicted valve failure through a visual alarm.

9. The method according to claim 6, wherein the metric further comprises a vibration of the valve and further comprising an accelerometer in the valve stem.

10. The method according to claim 6, further comprising the step of providing a second sensor attached to an exterior wall of the valve stem, wherein the second sensor is a strain gauge.

\* \* \* \* \*